US011891703B2

(12) United States Patent
Purdy et al.

(10) Patent No.: US 11,891,703 B2
(45) **Date of Patent: *Feb. 6, 2024**

(54) CORROSION INHIBITION PACKAGE

(71) Applicant: DORF KETAL CHEMICALS FZE, Fujairah (AE)

(72) Inventors: Clay Purdy, Medicine Hat (CA); Markus Weissenberger, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,063

(22) Filed: Dec. 14, 2022

(65) Prior Publication Data

US 2023/0124406 A1 Apr. 20, 2023

Related U.S. Application Data

(63) Continuation of application No. 16/481,332, filed as application No. PCT/CA2018/000022 on Feb. 2, 2018, now Pat. No. 11,542,608.

(30) Foreign Application Priority Data

Feb. 3, 2017 (CA) ................................ CA 2956939

(51) Int. Cl.

| | |
|---|---|
| ***C23F 11/04*** | (2006.01) |
| ***C09K 8/52*** | (2006.01) |
| ***C23F 11/12*** | (2006.01) |
| ***C23F 11/14*** | (2006.01) |
| ***C23F 11/16*** | (2006.01) |
| ***C23G 1/06*** | (2006.01) |
| *C09K 8/54* | (2006.01) |

(52) U.S. Cl.
CPC .......... *C23F 11/122* (2013.01); *C23F 11/144* (2013.01); *C23F 11/145* (2013.01); *C23F 11/16* (2013.01); *C23G 1/06* (2013.01); *C09K 8/54* (2013.01); *C09K 2208/32* (2013.01)

(58) Field of Classification Search
CPC ..... C23F 11/122; C23F 11/144; C23F 11/145; C23F 11/16; C23F 11/04; C23G 1/06; C23G 1/08; C09K 8/54; C09K 2208/32; C09K 8/52; C09K 8/584; C09K 8/602; C09K 8/74
See application file for complete search history.

(56) References Cited

U.S. PATENT DOCUMENTS

| | | | | |
|---|---|---|---|---|
| 8,323,417 | B2 | 12/2012 | Fan et al. | |
| 8,765,021 | B2 | 7/2014 | Zanetto | |
| 8,858,717 | B2 | 10/2014 | Fan et al. | |
| 9,074,289 | B2 | 7/2015 | Malwitz et al. | |
| 2003/0166472 | A1 | 9/2003 | Pursley et al. | |
| 2006/0264335 | A1 | 11/2006 | Penna et al. | |
| 2007/0010404 | A1 | 1/2007 | Welton et al. | |
| 2013/0137622 | A1 | 5/2013 | Borst et al. | |
| 2014/0116708 | A1 | 5/2014 | Wadekar et al. | |
| 2015/0114647 | A1* | 4/2015 | Jiang | C09K 8/74 166/305.1 |
| 2015/0122485 | A1* | 5/2015 | Jiang | C09K 8/54 510/188 |
| 2015/0329767 | A1 | 11/2015 | Vaughn et al. | |
| 2015/0344771 | A1 | 12/2015 | Juang et al. | |

FOREIGN PATENT DOCUMENTS

| | | | |
|---|---|---|---|
| CA | 2903603 | A1 | 10/2014 |
| CA | 2891278 | A1 | 11/2015 |
| EP | 1724375 | A2 | 11/2006 |

* cited by examiner

*Primary Examiner* — Haidung D Nguyen
(74) *Attorney, Agent, or Firm* — Heslin Rothenberg Farley & Mesiti, P.C.

(57) ABSTRACT

A corrosion inhibition package for use with an aqueous acid composition, said package comprising: a terpene; a cinnamaldehyde or a derivative thereof; at least one amphoteric surfactant; and a solvent. Also disclosed are compositions comprising said corrosion inhibitor package. Preferably, the corrosion inhibition package meets the environmental requirements for classification as yellow according to the Norwegian North Sea offshore drilling regulatory requirements.

13 Claims, No Drawings

CORROSION INHIBITION PACKAGE

CROSS REFERENCE TO RELATED APPLICATIONS

This is a Continuation Application of pending U.S. application Ser. No. 16/481,332, filed on Jul. 26, 2019, which is a U.S. National Phase filing under 35 U.S.C. § 371 of International Application PCT/CA2018/000022, filed Feb. 2, 2018. PCT/CA2018/000022 claims priority from Canadian Patent Application Number 2,956,939, filed Feb. 3, 2017. The entire contents of each of these applications are hereby expressly incorporated herein by reference.

FIELD OF THE INVENTION

This invention relates to corrosion inhibition packages for use with acidic compositions, more specifically to corrosion inhibition packages which provide an enhanced environmentally-friendly characteristic while still providing industry-leading corrosion protection.

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation or remediation is used to further encourage permeability and flow from an already existing well that has become under-productive.

Acidizing is a type of stimulation treatment which is performed above or below the reservoir fracture pressure in an effort to restore or increase the natural permeability of the reservoir rock. Acidizing is achieved by pumping acid into the well to dissolve typically limestone, dolomite and calcite cement between the sediment grains of the reservoir rocks or to treat acid soluble scale accumulation.

There are three major types of acid applications: matrix acidizing, fracture acidizing, and breakdown acidizing (pumped prior to a fracturing pad or cement operation in order to assist with formation breakdown (reduce fracture pressures, increased feed rates), as well as clean up left over cement in the well bore or perforations. A matrix acid treatment is performed when acid is pumped into the well and into the pores of the reservoir formation below the fracture pressure. In this form of acidization, the acids dissolve the sediments formation and/or mud solids that are inhibiting the permeability of the rock, enlarging the natural pores of the reservoir while creating wormholes and stimulating flow of hydrocarbons to the wellbore. While matrix acidizing is when pressures are maintained below the fracture gradient, fracture acidizing involves pumping highly pressurized acid into the well above the formation fracture gradient, physically fracturing the reservoir rock allowing the acid to etch the permeability inhibitive sediments. This type of acid treatment forms channels or fractures and etches through which the hydrocarbons can flow. In some instances, a proppant is introduced into the fluid which assists in propping open the fractures, further enhancing the flow of hydrocarbons into the wellbore.

There are many different mineral and organic acids used to perform an acid treatment on wells. The most common type of acid employed on wells to stimulate production is hydrochloric acid (HCl), which is useful in stimulating carbonate reservoirs.

Some of the major challenges faced in the oil & gas offshore industry from using hydrochloric acid include the following: extremely high levels of corrosion (which is countered by the addition of 'filming' type corrosion inhibitors that are typically themselves toxic and harmful to humans, the environment and equipment and thus affect the classification rating or use in many offshore jurisdictions (such as the North Sea). Reactions between acids and various types of metals can vary greatly but softer metals, such as aluminum and magnesium, are very susceptible to major effects causing immediate damage. Hydrochloric acid produces Hydrogen chloride gas which is toxic (potentially fatal) and corrosive to skin, eyes and metals. At levels above 50 ppm (parts per million) it can be Immediately Dangerous to Life and Health (IDHL). At levels from 1300-2000 ppm death can occur in 2-3 minutes.

The inherent negative effects (organic sterility, poisoning of wildlife, personnel exposure, high corrosion, hazardous fumes etc.) of HCl and the highly toxic and dangerous corrosion inhibitors added to reduce this corrosion can, in the event of an unintended or accidental release, on surface or down hole into water aquifers or other sources of water are devastating which can cause significant pH reduction of such and can substantially increase the toxicity and could potentially cause a mass culling of aquatic species and potential poisoning of humans or livestock and wildlife exposed to/or drinking the water. An unintended release at surface can also cause a hydrogen chloride gas plume to be released, potentially endangering human and animal health. This is a common event at large storage sites when tanks split or leak. Typically if near the public, large areas need to be evacuated post event and a comprehensive, expensive to implement, emergency evacuation plan need to be in place prior to approval of such storage areas. Because of its acidic nature, hydrogen chloride gas is also corrosive, particularly in the presence of moisture. A method to overcome gas fuming is by utilizing novel synthetic or modified acids which have an ability to greatly minimize this drawback all the while maintaining the efficiency of the acid downhole.

The inability for acids, and blends of such, to biodegrade naturally without neutralizing the soil results in expensive cleanup-reclamation costs for the operator should an unintended release occur. Moreover, the toxic fumes produced by mineral & some organic acids are harmful to humans/animals and are highly corrosive and/or produce potentially explosive vapours. Transportation and storage requirements for acids are restrictive and taxing in such that you must haul the products in acid approved tankers or intermediate bulk containers (IBC) that are rated to handle such corrosive products. As well, the dangers surrounding exposure by personnel handling the blending of such corrosive/dangerous products limits their use/implementation. Some if not most of these problems have been greatly minimized through the use of synthetic acids as mentioned above.

Another concern is the potential for human or environmental exposure incidents on locations due to high corrosion levels of acids causing storage container failures and/or deployment equipment failures i.e. coiled tubing or fracturing iron failures caused by high corrosion rates (pitting, cracks, pinholes and major failures). Other concerns include: downhole equipment failures from corrosion causing the operator to have to execute a work-over and replace down hole pumps, tubing, cables, packers etc.; inconsistent strength or quality level of mineral & organic acids; potential supply issues based on industrial output levels; high levels of corrosion on surface pumping equipment resulting in expensive repair and maintenance levels for operators and service companies; the requirement of specialized equipment that is purpose built to pump acids greatly increasing the capital expenditures of operators and service companies; and the inability to source a finished product locally or very near its end use; transportation and onsite storage difficulties.

Extremely high corrosion and reaction rates with temperature increase causes conventional acids to "spend/react or become neutral" prior to achieving its desired effect such as deeply penetrating an oil or gas formation to increase the wormhole or etched "pathway" effectively to allow the petroleum product to flow freely to the wellbore. As an example, hydrochloric acid can be utilized in an attempt to free stuck drill pipe in some situations. Prior to getting to the required depth to dissolve the formation that has caused the pipe/tubing to become stuck many acids spend or neutralize due to increased bottom hole temperatures and greatly increased reaction rate, so it is advantageous to have an alternative that spends or reacts more methodically allowing the slough to be treated with a solution that is still active, allowing the pipe/tubing to be pulled free.

When used to treat scaling issues on surface due to water contamination, conventional acids are exposed to human and mechanical devices as well as expensive pumping equipment causing increased risk for the operator and corrosion effects that damage equipment and create hazardous fumes. When mixed with bases or higher pH fluids or even water, acids will create a large amount of thermal energy (exothermic reaction) causing potential safety concerns and equipment damage, acids typically need to be blended with fresh water (due to their intolerance of highly saline water, causing potential precipitation of minerals) to the desired concentration requiring companies to pre-blend off-site as opposed to blending on-site with field/produced water thereby increasing costs associated with transportation.

Conventional mineral acids used in a pH control situation can cause rapid degradation of certain polymers/additives requiring increased loadings or chemicals to be added to counter these negative effects. Many offshore areas of operations have very strict regulatory rules regarding the transportation/handling and deployment of acids causing increased liability and costs for the operator. When using an acid to pickle tubing or pipe, very careful attention must be paid to the process due to high levels of corrosion, as temperatures increase, the typical additives used to control corrosion levels in acid systems begin to degrade very quickly (due to the inhibitors "plating out" on the steel) causing the acids to become very corrosive and resulting in damage to downhole equipment/tubulars.

Acids perform many actions in the oil & gas industry and are considered necessary to achieve the desired production of various petroleum wells, maintain their respective systems and aid in certain drilling operational functions (i.e. freeing stuck pipe, filter cake treatments). The associated dangers that come with using mineral acids are expansive and tasking to mitigate through controls whether they are chemically or mechanically engineered. The required addition of corrosion inhibitor systems that are toxic, incompatible with anionic additives, contain hazardous materials such as quaternary amines, which are thought to be the chemical group responsible for anaphylactic reactions along with other negative human effects. Any corrosion inhibitor that is effective in HCl or modified and synthetic acids is advantageous. Eliminating or even simply reducing the negative effects of acids while maintaining their usefulness is a struggle for the industry due to the limited availability of friendlier, effect corrosion inhibitor systems. As the public demand for the use of cleaner/safer/greener products increases, companies are looking for alternatives that perform the required function without all or most of the drawbacks associated with the use of conventional mineral acids. Some of the problems raised above have been greatly mitigated through the implementation and use of novel synthetic and modified acids and corrosion inhibitors. However, even some of those synthetic and modified acid compositions comprise certain chemicals which prohibit their use in certain environments, namely the corrosion inhibitor components.

Offshore, and now many onshore (European areas as an example) oil and gas operations are highly regulated or becoming highly regulated due to the environmental and human exposure concerns which arise from their operations and the potential for spills and water table contamination. The complexity of drilling and completing offshore and onshore wells is compounded by both safety issues for workers on such work sites and production platforms, facilities as well as environmental concerns. In most all cases and jurisdictions approved offshore corrosion inhibitor and/or acid systems will meet or exceed the required toxicity and biodegradation parameters for onshore use, even in highly restricted areas.

Many countries bordering the waters where offshore drilling and production is routinely carried out have implemented a number of regulations aimed at minimizing the environmental impact of this practice. These regulations include the ban on certain types of chemicals which may be harmful to marine life and the environment or have overall toxicity levels that could be harmful to humans, animals or the environment in general. In order to overcome these very restrictive regulations, many oil companies employ very costly containment programs for the handling of certain chemicals such as acids with common corrosion inhibitors which have a wide array of uses in the industry of oil and gas exploration and production along within other industries.

Norwegian offshore drilling regulations are amongst the most stringent on the planet. The regulatory authorities routinely carry out monitoring of the water column in each of the 11 offshore regions of Norwegian waters.

This monitoring involves the measurement and tracking of pollutants or biological effects of pollutants, using caged or wild-caught organisms. This allows the regulatory authorities to assess the impact of offshore drilling on the marine fauna. In concert with these intense regulatory monitoring activities, the approval of offshore chemicals is another aspect that is intensely controlled. Currently there are only two companies in the world that have a fully classified "Yellow" corrosion inhibitor system by the Norwegian authorities, NEMS.

In addition to the water column monitoring, the regulatory body takes sediment samples from the seabed to assess the pollution which does not enter fishes and other organisms. These physical and chemical sediment testing seek to quantify: the total organic matter (TOM); grain size distribution; hydrocarbons and synthetic drilling fluids; metals; and radioactivity.

The chemicals are classified according three main criteria: persistence (lack of biodegradation, liability to bioaccumulate and toxicity.

Many of the issues related with offshore oil and gas exploration and production stem from the fact that the conditions under which this is carried out are substantially different than those encountered in the same types of operations carried out onshore.

Acidic compositions and corrosion inhibitors conventionally used in various oil and gas operations can reach temperatures of up to 130° C. and above. At these temperatures, their reactivity is exponentially increased and, as such, their effectiveness or even their ability to be utilized is greatly decreased. Corrosion is the major concern at high temperatures and is difficult and expensive to control with additional, currently available chemistry.

Modified and synthetic acids developed and currently patented are aimed at, but not limited too, increasing personnel safety, reducing corrosion effects, reducing environmental damage, retarding the reaction and diffusion rate, increasing worm-holing efficiency (reducing competing wormholes) and reducing the toxicity profile of HCl. Additionally, there is the risk of wellbore and/or formation damage due to uncontrolled solubilized mineral precipitation due to an increase in the pH caused mainly by the formation of ammonia during the decomposition phase from urea-hydrochloride based systems. The advent of more advanced synthetic or modified acids is intended on providing usage at higher temperatures while still maintain the performance, safety and environmental advantages and benefits of a urea-HCl modified or synthetic acid system, but ultimately at these higher temperatures it is most often desirable to utilize additional or purpose developed corrosion inhibition packages and/or components to control corrosion of exposed steel and minimize negative effects on elastomers and the formation itself. In that respect, even short exposure times at high temperature are more damaging to steel than longer exposure times at lower temperatures. In keeping with the industrial shift, there is also a strong desire to develop corrosion packages which are more "environmentally friendly and more effective" than conventional or currently available systems.

EP patent application 1 724 375 A2 discloses an aqueous organic acid composition containing a terpene as corrosion inhibitor intensifier said to be especially suitable for use in acidizing subterranean formations and wellbores. The composition is said to substantially reduce the corrosive effects of the acidic solution on metals in contact with the acidic solution. Suitable terpenes are said to include carotene, limonene, pinene, farnesene, camphor, cymene and menthol.

U.S. Pat. No. 8,765,021 teaches an aqueous treatment composition for inhibiting corrosion and acid attack on metallic surfaces that comprises a thiourea organic derivative, a polyalkoxylated terpene nonionic surfactant and an acid. It is stated that the invention also relates to a process for cleaning industrial metallic equipment, in particular heat exchangers in which a heat transfer fluid, generally based on air or on water, flows, with a view to cleaning them and removing scale and other soiling.

US patent application no. 2003/0166472 discloses a well treatment microemulsion that is formed by combining a solvent-surfactant blend with a carrier fluid. In preferred embodiments, the solvent-surfactant blend includes a surfactant and a solvent selected from the group consisting of terpenes and alkyl or aryl esters of short chain alcohols. The description states that the disclosed well treatment microemulsion can be used in well remediation, stimulation and hydrogen sulfide mitigation operations.

U.S. Pat. No. 8,323,417 teaches a method of treatment for inhibiting sulfur-based corrosion or scaling or for removing scaling from a surface including inhibiting corrosion caused by sulfur-containing materials, reducing corrosion caused by sulfur-containing materials, inhibiting scaling caused by sulfur-containing materials in gas, liquid or solid phase or any combination of multiple phases of materials, reducing scaling caused by sulfur-containing materials, and removing scaling caused by sulfur-containing materials. The method involves contacting sulfur-containing materials with a composition containing a turpentine liquid, wherein said turpentine liquid comprises α-terpineol, β-terpineol, β-pinene, and p-cymene.

US patent application no. 2006/0264335 A1 discloses an aqueous organic acid composition containing a terpene as corrosion inhibitor intensifier is especially suitable for use in acidizing subterranean formations and wellbores. It is stated that the composition substantially reduces the corrosive effects of the acidic solution on metals in contact with the acidic solution. Suitable terpenes are said to include carotene, limonene, pinene, farnesene, camphor, cymene and menthol.

U.S. Pat. No. 9,074,289 B2 discloses a method of inhibiting corrosion of a surface in contact with a corrosive environment encountered in oil and gas operations. The method includes contacting the surface with a composition comprising a quaternary nitrogen-containing corrosion inhibitor. The patent teaches the use of such inhibitor at levels ranging from 0.1 to 8%.

Despite the various known corrosion inhibition packages and components, there is still a need for corrosion inhibition packages for use with HCl, modified and synthetic acid compositions in the oil industry which can be used over a range of applications, that are formulated to be useful for synthetic and modified acid systems and still be effective with conventional acids such as HCl and can be used at high temperatures (i.e. ~130° C.) without having its components degrade, phase out of solution while having a superior safety and environmental profile over known packages and components during use across a broad range of temperatures. Moreover, it is desirable to have corrosion inhibition packages that do not undermine the advantages of environmentally and personnel-friendly acid compositions such as various synthetic and modified acid compositions which have far fewer deleterious effects than typical conventional mineral and some organic acids.

Certain corrosion inhibitors components such as propargyl alcohol are undesirable in offshore and on-shore application such as in the North Sea as it is classified red in Norwegian waters and moreover has a poor performance on the popular Cr-13 alloys since it tends to allow the pitting of the surface. Surfactants are desirable when used in combination with corrosion inhibitors but they also carry their own set of issues, as they have in general a high acute fish toxicity and lower biodegradability (less than 60% in seawater). In light of those drawbacks, short chain non-ionic surfactants are typically preferred, because they typically exhibit better acute fish toxicity. However, a disadvantage of short chain non-ionic surfactants is that they usually have lower dispersion ability. Therefore, it is much more difficult and, in some cases, not possible to disperse a relatively hydrophobic corrosion inhibition component (such as citral or also cinnamaldehyde or other terpenes) with a nonionic surfactant.

In light of the prior art, the inventors have formulated corrosion inhibiting compositions capable of overcoming at least one of the drawbacks of known acidic compositions. It was surprisingly discovered that the corrosion inhibition packages according to the present invention exhibit stability when combined with acidic compositions under exposure to elevated temperature (up to and above 130° C.) as well as being compatible with anionic additives. This consequently makes them useful in various industries using acids at these temperatures including, but not limited to, the oil and gas industry.

SUMMARY OF THE INVENTION

The inventors have unexpectedly discovered that a specific surfactant class that is rated yellow for North Sea applications can also provide very good dissolution of corrosion inhibitors with loading ranges that make it economically feasible to use. This class of surfactant, amido betaines, allow the production of a stable dispersion of a terpene component in acid without phase separation, while providing a yellow rating in Norwegian waters. According to a first aspect of the present invention, there is provided a corrosion inhibition package for use with an aqueous acid composition, said package comprising:

- a terpene;
- a cinnamaldehyde or a derivative thereof;
- at least one amphoteric surfactant; and
- a solvent.

Preferably, the terpene is selected from the group consisting of: citral; ionone; ocimene; carvone; and cymene. A preferred terpene is citral.

Preferably, the at least one amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from C8 to C16. Most preferably, the amido betaine comprising a hydrophobic tail from C8 to C16 is cocamidobetaine.

Preferably, the corrosion inhibition package according to the present invention is comprised of components giving it an environmental classification in Norwegian waters of at least "Yellow".

Preferably also, the corrosion inhibition package further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from C8 to C16. Most preferably, the dicarboxylic surfactant is sodium lauriminodipropionate Preferably, the surfactant is selected from the group consisting of: cocamidopropyl betaine; β-Alanine, N-(2-carboxyethyl)-N-dodecyl-, sodium salt (1:1); and a combination thereof.

Preferably, the solvent is selected from the group consisting of: methanol; ethanol; isopropanol; ethylene glycol; and 2-butoxyethanol; and combinations thereof. A preferred solvent is methanol. According to a preferred embodiment of the present invention, short chain ethoxylates are used as solvent. Preferably, the short chain ethoxylate is NOVEL® 6-3 Ethoxylate. This is a biodegradable, nonionic surfactant derived from linear primary ALFOL® 6 Alcohol. It is essentially 100% active and has the following structural formula: $CH_3\ (CH_2)_4CH_2(OCH_2CH_2)_3OH$. It is a clear, colorless liquid that is sparingly soluble in water but soluble in hydrocarbons.

Preferably, the terpene is present in an amount ranging from 2% to 25% by weight of the total weight of the corrosion inhibition package. Preferably also, the cinnamaldehyde or derivative thereof is present in amount ranging from 2 to 25% by volume of the volume of the corrosion inhibitor. Preferably also, the at least one surfactant is present in an amount ranging from 2% to 20% by volume of the total volume of the corrosion inhibition package. Preferably also, the solvent is present in an amount ranging from 25% to 80%, more preferably from 25% to 75% by volume of the total weight of the corrosion inhibition package.

According to another aspect of the present invention, there is provided an acidic composition comprising:

- an acid;
- a corrosion package comprising:
  - a terpene;
  - a cinnamaldehyde or a derivative thereof;
  - at least one surfactant; and
  - a solvent;

wherein the volume % of the corrosion package in the acidic composition ranges from 0.1 to 7.5%. Preferably, the acidic composition further comprises a metal iodide or iodate.

Preferably the weight/volume % of the metal iodide or iodate in the acidic composition ranges from 0.1 to 1.5%. More preferably, the wt/vol. % of the metal iodide or iodate in the acidic composition ranges from 0.25 to 1.25%. Even more preferably, the wt/vol. % of the metal iodide or iodate in the acidic composition is approximately 1%. Preferably, the metal iodide or iodate selected from the group consisting of: cuprous iodide; potassium iodide; sodium iodide; lithium iodide and combinations thereof. More preferably, the metal iodide is potassium iodide.

According to one aspect of the present invention, there is provided an acidic composition comprising a corrosion inhibition package according to the invention and an acid selected from the group consisting of: mineral acids; organic acids, synthetic acids; and combinations thereof. More preferably, the acid is selected from the group consisting of: HCl; Lysine-HCl; Urea-HCl; hydrofluoric acid; sulfuric acid; phosphoric acid; phosphoric acid-urea; p-toluene sulfonic acid; methanesulfonic acid; and methanesulfonic acid-urea. Even more preferably, the acid is HCl, Urea-HCl, lysine-HCl or monoethanolamine (MEA)-HCl. Certain combinations of acids can also mixed with a corrosion inhibitor package according to a preferred embodiment of the present invention.

According to an aspect of the present invention, there is provided an aqueous synthetic or modified acid composition for use in onshore oil and gas operations, said composition comprising: lysine and hydrochloric acid in a molar ratio of not less than 1:12; a surfactant; a corrosion inhibitor; and an intensifier. Preferably, not less than 1:8, more preferably 1:5. According to another preferred embodiment, the ratio is of not less than 1:3.

According to a preferred embodiment of the present invention, there is provided an aqueous synthetic or modified acid composition for use in offshore and onshore oil and gas and industrial operations, said composition comprising: urea and hydrochloric acid in a molar ratio of not less than 0.1:1; a corrosion inhibitor; and an intensifier. More preferably, the ratio is not less than 0.3:1; even more preferably, the ratio is not less that 0.5:1; yet even more preferably the ratio is not less than 0.7:1.

According to a preferred embodiment of the present invention, the corrosion inhibition package is used with an acidic composition such as a modified acid composition comprising:

- a strong acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 3.5:1; and yet even more preferably in a molar ratio of not more than 2.5:1.

According to a preferred embodiment of the present invention, there is provided a use of a corrosion inhibitor package with an acidic composition where the acidic composition comprises an acid selected from the group consisting of: a mineral acid; an organic acid or a synthetic acid, said corrosion inhibitor package comprising:

a terpene;

a cinnamaldehyde or a derivative thereof;

at least one amphoteric surfactant; and a solvent.

According to another aspect of the present invention, there is provided a use of a synthetic or modified acid composition comprising a preferred embodiment of the corrosion inhibition package according to the present invention in the oil and gas industry to perform an activity selected from the group consisting of: stimulating formations; assisting in reducing breakdown pressures during downhole pumping operations; treating wellbore filter cake post drilling operations; assisting in freeing stuck pipe; descaling pipelines and/or production wells; increasing injectivity of injection wells; lowering the pH of a fluid; fracturing wells; performing matrix stimulations; conducting annular and bullhead squeezes & soaks; pickling tubing, pipe and/or coiled tubing; increasing effective permeability of formations; reducing or removing wellbore damage; cleaning perforations, nozzles, ports, jets, etc.; solubilizing limestone, dolomite, and calcite; and removing undesirable scale, unassisted or natural high formation temperature production wells, injection wells and their related surface and down-hole equipment and facilities at temperatures up to 130° C.

According to another aspect of the present invention, there is provided a synthetic or modified acid composition comprising a corrosion inhibition package according to a preferred embodiment for use in the oil and gas industry which has high salinity tolerance. A tolerance for high salinity fluids, or brines, can be desirable for offshore acid applications. Conventional acids are normally blended with fresh water and additives, typically far offsite, and then transported to the area of treatment as a finished blend. In certain instances it may prove advantageous to have an alternative that can be transported as a concentrate safely to the treatment area, then blended with a saline produced water or sea water greatly reducing the logistics requirement. A conventional acid composition can precipitate salts/minerals heavily if blended with fluids of an excessive saline level resulting in formation plugging or ancillary damage, inhibiting production and substantially increasing costs. Brines are also typically present in formations, thus having an acidic composition system that has a high tolerance for brines greatly reduces the potential for formation damage or emulsions forming down-hole during or after product placement/spending (reaction) occurs.

A preferred embodiment of the present invention provides a corrosion inhibition package which provides various oilfield grade steel alloys exceptional protection against corrosion when exposed to acidic compositions at low to high temperatures (upwards of 130° C.). Additionally, the components used in the preferred corrosion inhibition package are quite environmentally friendly.

DETAILED DESCRIPTION OF THE PREFERRED EMBODIMENTS

The description that follows, and the embodiments described therein, is provided by way of illustration of an example, or examples, of particular embodiments of the principles of the present invention. These examples are provided for the purposes of explanation, and not limitation, of those principles and of the invention.

According to an aspect of the invention, there is provided a corrosion inhibition package for use with an acidic composition which will be placed in contact with a metallic surface, said corrosion inhibition package comprising:

a terpene;

cinnamaldehyde or a derivative thereof;

at least one amphoteric surfactant; and a solvent.

Preferably, the corrosion inhibition package is used with an acidic composition such as a synthetic acid composition comprising:

lysine & hydrogen chloride in a molar ratio of not less than 1:12; preferably in a molar ratio not less than 1:8, more preferably in a molar ratio of not less than 1:5, even more preferably in a molar ratio of not less than 1:3 and even more preferably in a molar ratio of not less than 1:2.5.

According to another preferred embodiment, the corrosion inhibition package is used with an acidic composition such as a synthetic or modified acid composition comprising: urea and hydrogen chloride in a molar ratio of not less than 0.1:1; more preferably in the urea and hydrogen chloride are present in a molar ratio of not less than 0.5:1; yet more preferably in the urea and hydrogen chloride are present in a molar ratio of not less than 0.7:1, and even more preferably in the urea and hydrogen chloride are present in a molar ratio of not less than 1:1.

According to yet another preferred embodiment of the present invention, a corrosion inhibition package comprising a terpene; cinnamaldehyde or a derivative thereof; at least one amphoteric surfactant; and a solvent, can be used with neat HCl. The % volume of the corrosion inhibition package will be determined by the temperature at which the composition will be exposed when in use, as well as the type of metal, the concentration of the HCl and duration of time of exposure. Preferably, the corrosion inhibition package should be present in a concentration ranging from 0.1% to 5 vol % of the volume of the composition.

Preferably, when the synthetic or modified acid composition comprises lysine and hydrogen chloride, the molar ratio of lysine to HCl can range from 1:2 to 1:12; preferably in a molar ratio ranging from 1:2.5 to 1:8, more preferably in a molar ratio ranging from 1:3 to 1:6, even more preferably in a molar ratio ranging from 1:3 to 1:5.

The terpenes considered by the inventors to achieve desirable corrosion inhibition results comprise: monoterpenes (acyclic); monocyclic terpenes; and beta-Ionone. Exemplary but non-limiting compounds of some of the previously listed terpene sub-classes comprise: for monoterpenes: citral (mixture of geranial and neral); citronellal; geraniol; and ocimene; for monocyclic terpenes: alpha-terpinene; carvone; p-cymene. More preferably, the terpenes are selected from the group consisting of: citral; ionone; ocimene; and cymene. Most preferred is citral.

According to a preferred embodiment of the present invention, the corrosion inhibition package comprises a surfactant which is environmentally friendly. More preferably, the surfactant is capable of withstanding exposure to temperatures of up to least 130° C. for a period of 2 to 6 hours in a closed environment without undergoing degradation.

Preferably, the at least one amphoteric surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from C8 to C16. Most preferably, the amido betaine comprising a hydrophobic tail from C8 to $C_{16}$ is cocamidobetaine.

Preferably, the cinnamaldehyde derivative are selected from the group consisting of: dicinnamaldehyde p-hydroxycinnamaldehyde; p-methylcinnamaldehyde; p-ethylcinnamaldehyde; p-ethoxycinaldehyde; p-dimethylaminocinnamaldehyde; p-diethylaminocinnamaldehyde; p-nitrocinnamaldehyde; o-nitrocinnamaldehyde; 4-(3-propenal)cinnamaldehyde; p-sodium sulfocinnamaldehyde p-trimethylammoniumcinnamaldehyde sulfate; p-trimethylammoniumcinnamaldehyde o-methylsulfate; p-thiocyanocinnamaldehyde; p-(S-acetyl)thiocinnamaldehyde; p-(S—N,N-dimethylcarbamoylthio)cinnamaldehyde; p-chlorocinnamaldehyde; a-ethylcinnamaldehyde; β-methylcinnamaldehyde; a-chlorocinnamaldehyde a-bromocinnamaldehyde; a-butylcinnamaldehyde; a-amylcinnamaldehyde; a-hexylcinnamaldehyde; α-bromo-p-cyanocinnamaldehyde; α-ethyl-p-methylcinnamaldehyde and p-methyl-a-pentylcinnamaldehyde.

Preferably also, the corrosion inhibition package further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from C8 to C16. Most preferably, the dicarboxylic surfactant is sodium lauriminodipropionate A preferred embodiment can refer to a corrosion inhibition package comprising cocamidopropyl betaine and β-Alanine, N-(2-carboxyethyl)-N-dodecyl-, sodium salt (1:1).

According to a preferred embodiment of the present invention, when preparing an acidic composition comprising a corrosion inhibition package, metal iodides or iodates such as potassium iodide, sodium iodide, cuprous iodide and lithium iodide can be added as corrosion inhibitor intensifier. The iodide or iodate is preferably present in a weight/volume percentage ranging from 0.1 to 1.5%, more preferably from 0.25 to 1.25%, yet even more preferably 1% by weight/volume of the acidic composition. Most preferably, the iodide used is potassium iodide. According to a preferred embodiment, chlorides such as aluminum chloride, calcium chloride, bismuth chloride and magnesium chloride can be used instead of metal iodides or iodates as intensifiers.

According to a preferred embodiment of the present invention, the corrosion package comprises: cocamidopropyl betaine in an amount of approximately 5% by volume of the total volume of the package; Citral in an amount of approximately 10% by volume of the total volume of the package; cinnamaldehyde in an amount of approximately 10% by volume of the total volume of the package; and methanol in an amount of approximately 75% by volume of the total volume of the package.

Also, preferably, the corrosion inhibition package is used with an acidic composition such as a modified acid composition comprising:

a strong acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 3.5:1; and yet even more preferably in a molar ratio of not less than 2.5:1.

In that respect, the composition comprises an alkanolamine and a strong acid, such as HCl, nitric acid, sulfuric acid, sulfonic acid. The alkanolamine according to the present invention contains at least one amino group, $—NH_2$, and one alcohol group, —OH. Preferred alkanolamines include, but are not limited to, monoethanolamine, diethanolamine and triethanolamine. More preferred are monoethanolamine, diethanolamine. Most preferred is monoethanolamine.

According to a preferred method of use, the corrosion inhibitor package is mixed with an acid prior to its transport to a job site. Alternatively, a corrosion inhibitor package according to the present invention can be mixed with the acid prior to its use while using proper mixing equipment and mixing the combined composition thoroughly to ensure homogenous mixing.

Example 1—Process to Prepare an Acidic Composition Comprising a Corrosion Inhibition Package According to a Preferred Embodiment of the Invention The corrosion inhibition package is prepared by dispersing a terpene component in a solvent, in this case methanol, and at least one surfactant. Afterwards, the corrosion inhibition package thus prepared is mixed with an acidic composition. Applying this procedure, allows for the formation of a surfactant complex as described below.

According to a preferred embodiment of the present invention, since the corrosion inhibition package is intended for use at high temperatures, the combination of a betaine and a carboxylic surfactant is desirable. The combination of a carboxylic surfactant and a betaine is known to form a 1:1 or 1:2 complex, which also has a high molecular weight. Therefore, it is important to disperse the terpene component into isopropanol. Otherwise, the resulting acidic composition may not meet the class 1 fluid (transparent, no phase separation).

To prepare an aqueous acidic composition of a modified acid, lysine mono-hydrochloride is used as starting reagent. To obtain a 1:2 molar ratio of lysine to HCl, 370 ml of 50 wt % lysine-HCl solution and 200 ml HCl aq. 36% (22 Baume) are combined. The corrosion inhibition package and potassium iodide are added at this point. Circulation is maintained until all products have been solubilized. Additional products can now be added as required.

The resulting composition of Example 1 is an amber-colored liquid with a fermentation-like odour having an expected shelf-life of greater than a year. It has a freezing point temperature of approximately minus 45° C. and a boiling point temperature of approximately 100° C. It has a specific gravity of 1.15±0.02. It is completely soluble in water and its pH is less than 1. The composition is biodegradable and is classified as a mild irritant according to the classifications for skin tests. The composition is substantially low fuming. Toxicity testing was calculated using surrogate information and the LD 50 was determined to be greater than 2000 mg/kg.

With respect to the corrosion impact of the acidic composition on typical oilfield grade steel alloys, it was established that it was clearly well below the acceptable corrosion limits set by industry making it highly desirable as corrosion is the main challenge during acid applications causing substantial maintenance and workover costs over time.

Corrosion Inhibition Package Formulations

Various types of steel alloy coupons were subjected to corrosion testing in the presence of conventional, synthetic and modified acid compositions using corrosion inhibitor components according to preferred embodiments of the present invention at various temperatures. The results of the corrosion tests are reported in Tables 3 through 31. Coupons of various grades of steel alloys (indicated in each table) were exposed to the various listed compositions for various periods of time at varying temperatures. When the fluid system is diluted, it is so indicated in the table or title. For example, 50% indicates that the fluid system was diluted to half strength with tap water. Also, 50% seawater indicates that the fluid system was diluted to half strength with seawater (or an equivalent brine solution).

According to preferred embodiment of the present invention, citral can be present in a concentration ranging from 5 to 30 vol % of the total volume of the corrosion inhibition package; cinnamaldehyde can be present in a concentration ranging from 5 to 30 vol %; and cocamido betaine can be present in a concentration ranging from 2.5 to 15 vol %. Depending on various factors, such as temperature, acid, metal, etc. preferred corrosion inhibitor package loadings within the acid compositions can range between 0.1 to 7.5% vol/vol. More preferably, between 0.1 and 5% vol/vol. Biodegradation, toxicity and bioaccumulation testing carried out has indicated that most of the compositions listed below in Tables 1 and 2 have been identified as satisfactorily meeting the requirements for listing under a classification of Yellow for offshore use in the North Sea (Norway).

TABLE 1

List of Component and Content in Corrosion Inhibition Packages FCI-XV to FCI-XP (All figures are in vol %)

| Compound | FCI-XV | FCI-XT | FCI-XS | FCI-XR | FCI-XQ | FCI-XO | FCI-XP |
|---|---|---|---|---|---|---|---|
| Cocamidopropyl | 10 | 10 | 10 | 10 | 5 | 5 | 10 |
| betaine ß-Alanine, N-(2-carboxyethyl)-N-dodecyl-, sodium salt (1:1) | | | | | | | 10 |
| Citral | 10 | 20 | 25 | 25 | 25 | 25 | 25 |
| Cinnamaldehyde | | | 25 | 10 | 10 | | 10 |
| Carvone | | | | | | 10 | |
| Methanol | 80 | 70 | 40 | 55 | 60 | 60 | 45 |
| Total vol. % | 100 | 100 | 100 | 100 | 100 | 100 | 100 |

TABLE 2

List of Component and Content in Corrosion Inhibition Packages FCI-XN to FCI-XK (All figures are in vol %)

| Compound | FCI-XN | FCI-XM | FCI-XL | FCI-XI | FCI-XJ | FCI-XK |
|---|---|---|---|---|---|---|
| Cocamidopropyl betaine | 10 | 5 | 5 | 10 | 5 | 5 |
| ß.-Alanine, N-(2-carboxyethyl)-N-dodecyl-, sodium salt (1:1) | 10 | | 5 | 10 | | 5 |
| Citral | 10 | 10 | 10 | 15 | 15 | 15 |
| Cinnamaldehyde | 10 | 10 | 10 | 10 | 10 | 10 |
| Carvone | | | | | | |
| Methanol | 60 | 75 | 70 | 55 | 70 | 65 |
| Total vol. % | 100 | 100 | 100 | 100 | 100 | 100 |

Corrosion Testing

The following corrosion testing outlined in the tables below for a number of different corrosion inhibition packages according to the present invention in the presence of a synthetic or modified acid composition was carried out diluted with saline water (in most cases) at various temperatures for various durations of exposure. Depending on the intended use/application of an acidic fluid composition comprising a corrosion inhibitor package according to the present invention, a desirable result would be one where the $lb/ft^2$ corrosion number is at or below 0.05. A more desirable would be one where the corrosion (in $lb/ft^2$) is at or below 0.02. Generally, seawater has the deleterious effect of potentiating corrosion, consequently corrosion inhibition packages which follow the guidelines or regulations for offshore oil production are highly desirable for operators. Where applicable the fluids (acid compositions) were diluted as indicated.

The following abbreviations are used in the corrosion results tables: CI-1A—10% aqueous KI solution; ZA-Cinnamaldehyde; and CA-Citral.

TABLE #3

Corrosion test results from tests conducted at 90° C. for a period ranging for 6 hours with a coupon density of 7.86 g/cc having a surface area of 41.4 $cm^2$ (coupons used were 1018 steel)

| Fluid | Dilution | Corrosion Package | Wt loss (g) | Mils/yr | mm/year | lb/ft2 |
|---|---|---|---|---|---|---|
| 1.2:1 HCl-Urea | 50% dilution in seawater | 1% ZA 1% CI-1A | 0.168 | 296.053 | 7.52 | 0.008 |
| 1.2:1 HCl-Urea | 50% dilution in seawater | 1% FCI-XT 1% CI-1A | 0.54 | 954.5765 | 24.246 | 0.027 |
| 1.2:1 HCl-Urea | 50% dilution in seawater | 1.5% FCI-XT 1% CI-1A | 0.439 | 775.1076 | 19.688 | 0.022 |
| 1.2:1 HCl-Urea | 50% dilution in seawater | 1% FCI-XS 1% CI-1A | 0.18 | 318.6632 | 8.094 | 0.009 |
| 1.2:1 HCl-Urea | 50% dilution in seawater | 1% FCI-XS 0.5% CI-1A | 0.238 | 420.7626 | 10.687 | 0.012 |
| 1.2:1 HCl-Urea | 50% dilution in seawater | 1.5% FCI-XS 1% CI-1A | 0.151 | 266.9069 | 6.779 | 0.007 |
| 1.2:1 HCl-Urea | 50% dilution in seawater | 1.5% FCI-XS 0.5% CI-1A | 0.185 | 327.4953 | 8.318 | 0.009 |

TABLE #3-continued

Corrosion test results from tests conducted at 90° C. for a period ranging for 6 hours with a coupon density of 7.86 g/cc having a surface area of 41.4 $cm^2$ (coupons used were 1018 steel)

| Fluid | Dilution | Corrosion Package | Wt loss (g) | Mils/yr | mm/year | lb/ft2 |
|---|---|---|---|---|---|---|
| 1.2:1 HCl-Urea | 50% dilution in seawater | 2.5% FCI-XS 1% CI-1A | 0.124 | 218.6835 | 5.555 | 0.006 |
| 1.2:1 HCl-Urea | 50% dilution in seawater | 2.5% FCI-XS 0.5% CI-1A | 0.149 | 263.904 | 6.703 | 0.007 |
| 1.2:1 HCl-Urea | 50% dilution in seawater | 1% FCI-XR 1% CI-1A | 0.235 | 415.2867 | 10.548 | 0.012 |
| 1.2:1 HCl-Urea | 50% dilution in seawater | 1.5% FCI-XR 1% CI-1A | 0.153 | 270.6164 | 6.874 | 0.008 |
| 1.2:1 HCl-Urea | 50% dilution in seawater | 1% FCI-XQ 1% CI-1A | 0.274 | 484.3539 | 12.303 | 0.014 |
| 1.2:1 HCl-Urea | 50% dilution in seawater | 1% FCI-XQ 0.5% CI-1A | 0.341 | 602.5278 | 15.304 | 0.017 |
| 1.2:1 HCl-Urea | Diluted in 50% seawater | 1.5% FCI-XQ 1% CI-1A | 0.18 | 318.1333 | 8.081 | 0.009 |
| 1.2:1 | Diluted in 50% seawater | 1.5% FCI-XQ 0.5% CI-1A | 0.255 | 450.0853 | 11.432 | 0.013 |
| 1.2:1 | Diluted in 50% seawater | 1% FCI-XR 0.5% CI-1A | 0.312 | 551.3015 | 14.003 | 0.015 |
| 1.2:1 | Diluted in 50% seawater | 1.5% FCI-XR 1% CI-1A | 0.182 | 321.6661 | 8.17 | 0.009 |
| 1.2:1 HCl-Urea | Diluted in 50% seawater | 1.5% FCI-XR 0.5% CI-1A | 0.213 | 375.7188 | 9.543 | 0.011 |

Where the ratios are molar ratios and where CI-1A indicates potassium iodide present as intensifier . . .

Where the ratios are molar ratios and where CI-1A indicates potassium iodide present as intensifier.

TABLE #4

Corrosion test results from tests conducted at 110° C. for a period ranging for 6 hours with a coupon density of 7.86 g/cc having a surface area of 41.4 $cm^2$ (coupons used were 1018 steel)

| Fluid | Corrosion Package | Wt loss (g) | Mils/yr | mm/year | lb/ft2 |
|---|---|---|---|---|---|
| 21% MSA (diluted in seawater) | 1.5% FCI-XQ 1% CI-1A | 0.125 | 220.8032 | 5.608 | 0.006 |
| 21% MSA (diluted in seawater) | 1.5% FCI-XR 1% CI-1A | 0.1 | 176.4659 | 4.482 | 0.005 |
| 21% MSA (diluted in seawater) | 1.5% FCI-XS 1% CI-1A | 0.081 | 143.6104 | 3.648 | 0.004 |

TABLE #4-continued

Corrosion test results from tests conducted at 110° C. for a period ranging for 6 hours with a coupon density of 7.86 g/cc having a surface area of 41.4 $cm^2$ (coupons used were 1018 steel)

| Fluid | Corrosion Package | Wt loss (g) | Mils/yr | mm/year | lb/ft2 |
|---|---|---|---|---|---|
| 21% MSA (diluted in seawater) | 1.5% FCI-XT 1% CI-1A | 1.073 | 1895.022 | 48.134 | 0.053 |
| 21% MSA (diluted in seawater) | 1.5% FCI-XP 1% CI-1A | 0.048 | 85.49501 | 2.172 | 0.002 |

Wherein the 21% MSA solution diluted in seawater is prepare by adding 1 part volume of 42% methanesulfonic acid to 1 part volume seawater.

TABLE #5

Corrosion test results from tests conducted at 90° C. for a period ranging for 6 hours with a coupon density of 7.86 g/cc having a surface area of 41.4 $cm^2$ (coupons used were 1018 steel)

| Fluid | Dilution | Corrosion Package | Wt loss (g) | Mils/yr | mm/year | lb/ft2 |
|---|---|---|---|---|---|---|
| 1.2:1 HCl-Urea | 50% dilution in seawater | 1% FCI-XS 1% CI-1A | 0.171 | 301.3522 | 7.654 | 0.008 |
| 1.2:1 HCl-Urea | 50% dilution in seawater | 1% FCI-XS 0.5% CI-1A | 0.226 | 399.9188 | 10.158 | 0.011 |
| 1.2:1 HCl-Urea | 50% dilution in seawater | 1.5% FCI-XS 1% CI-1A | 0.127 | 224.6894 | 5.707 | 0.006 |
| 1.2:1 HCl-Urea | 50% dilution in seawater | 1.5% FCI-XS 0.5% CI-1A | 0.147 | 260.3712 | 6.613 | 0.007 |

TABLE #6

| Corrosion test results from tests conducted at 130° C. for a period ranging for 6 hours with a coupon density of 7.86 g/cc having a surface area of 41.4 cm$^2$ (coupons used were 1018 steel) | | | | | |
|---|---|---|---|---|---|
| Fluid | Corrosion Package | Wt loss (g) | Mils/yr | mm/year | lb/ft2 |
| 21% MSA (diluted in seawater) | 1.5% FCI-XQ 1% CI-1A | 2.249 | 3971.808 | 100.884 | 0.111 |
| 21% MSA (diluted in seawater) | 1.5% FCI-XR 1% CI-1A | 1.763 | 3114.032 | 79.096 | 0.087 |
| 21% MSA (diluted in seawater) | 1.5% FCI-XS 1% CI-1A | 0.237 | 418.8195 | 10.638 | 0.012 |
| 21% MSA (diluted in seawater) | 1.5% FCI-XT 1% CI-1A | 2.849 | 5032.37 | 127.822 | 0.141 |
| 21% MSA (diluted in seawater) | 1.5% FCI-XP 1% CI-1A | 0.114 | 201.9025 | 5.128 | 0.006 |

TABLE #7

| Corrosion test results from tests conducted at 90° C. for a period ranging for 4 or 6 hours with a coupon density of 7.86 g/cc having a surface area of 26.01 cm$^2$ (coupons used were CR-13-110 polished) | | | | | | | |
|---|---|---|---|---|---|---|---|
| Fluid | Dilution | Corrosion Package | Wt loss (g) | Time (hours) | Mils/yr | mm/year | lb/ft2 |
| HCR-2000N | 50% dilution in seawater | 5% FCI-XR 5% CI-1A | 0.66 | 4 | 2785.604 | 70.754 | 0.044 |
| HCR-2000N | 50% dilution in seawater | 5% FCI-XP 5% CI-1A | 0.459 | 4 | 1934.108 | 49.126 | 0.03 |

TABLE #8

| Corrosion test results from tests conducted at 70° C. for a period ranging for 6 hours with a coupon density of 7.86 g/cc having a surface area of 41.4 cm$^2$ (coupons used were 1018 steel) | | | | | | |
|---|---|---|---|---|---|---|
| Fluid | Dilution | Corrosion Package | Wt loss (g) | Mils/yr | mm/year | lb/ft2 |
| 1.2:1 HCl-Urea | 50% dilution in seawater | 1% FCI-XQ 1% CI-1A | 0.076 | 133.3651 | 3.387 | 0.004 |
| 1.2:1 HCl-Urea | 50% dilution in seawater | 1% FCI-XQ 0.5% CI-1A | 0.09 | 158.2717 | 4.02 | 0.004 |
| 1.2:1 HCl-Urea | 50% dilution in seawater | 1.5% FCI-XQ 1% CI-1A | 0.076 | 133.5418 | 3.392 | 0.004 |
| 1.2:1 HCl-Urea | 50% dilution in seawater | 1.5% FCI-XQ 0.5% CI-1A | 0.087 | 153.679 | 3.903 | 0.004 |
| 1.2:1 HCl-Urea | 50% dilution in seawater | 1% FCI-XR 1% CI-1A | 0.081 | 142.3739 | 3.616 | 0.004 |
| 1.2:1 HCl-Urea | 50% dilution in seawater | 1% FCI-XR 0.5% CI-1A | 0.097 | 171.1667 | 4.348 | 0.005 |
| 1.2:1 HCl-Urea | 50% dilution in seawater | 1.5% FCI-XR 1% CI-1A | 0.076 | 133.5418 | 3.392 | 0.004 |
| 1.2:1 HCl-Urea | 50% dilution in seawater | 1.5% FCI-XR 0.5% CI-1A | 0.091 | 160.7447 | 4.083 | 0.005 |
| 1.2:1 HCl-Urea | 50% dilution in seawater | 1% FCI-XS 1% CI-1A | 0.077 | 136.0148 | 3.455 | 0.004 |
| 1.2:1 HCl-Urea | 50% dilution in seawater | 1% FCI-XS 0.5% CI-1A | 0.097 | 170.8134 | 4.339 | 0.005 |
| 1.2:1 HCl-Urea | 50% dilution in seawater | 1.5% FCI-XS 1% CI-1A | 0.065 | 114.9943 | 2.921 | 0.003 |
| 1.2:1 HCl-Urea | 50% dilution in seawater | 1.5% FCI-XS 0.5% CI-1A | 0.07 | 124.0031 | 3.15 | 0.003 |

TABLE #9

Corrosion test results from tests conducted at 110° C. for a period ranging for 6 hours with a coupon density of 7.86 g/cc having a surface area of 41.4 $cm^2$ (coupons used were 1018 steel)

| Fluid | Dilution | Corrosion Package | Wt loss (g) | Mils/yr | mm/year | lb/ft2 |
|---|---|---|---|---|---|---|
| 4.5:1 HCl-Lysine | 50% dilution in seawater | 1.5% FCI-XQ 1% CI-1A | 0.463 | 817.5018 | 20.765 | 0.023 |
| 4.5:1 HCl-Lysine | 50% dilution in seawater | 1.5% FCI-XR 1% CI-1A | 0.176 | 311.4209 | 7.91 | 0.009 |
| 4.5:1 HCl-Lysine | 50% dilution in seawater | 1.5% FCI-XS 1% CI-1A | 0.157 | 276.6223 | 7.026 | 0.008 |
| 4.5:1 HCl-Lysine | 50% dilution in seawater | 1.5% FCI-XP 1% CI-1A | 0.238 | 421.1159 | 10.696 | 0.012 |
| 4.5:1 HCl-Lysine | 50% dilution in seawater | 1.5% FCI-XT 1% CI-1A | 1.12 | 1978.927 | 50.265 | 0.055 |

TABLE #10

Corrosion test results from tests conducted at 90° C. for a period ranging for 6 hours with a coupon density of 7.86 g/cc having a surface area of 28.922 $cm^2$ (coupons used were J55 steel)

| Fluid | Dilution | Corrosion Package | Wt loss (g) | Mils/yr | mm/year | lb/ft2 | observations |
|---|---|---|---|---|---|---|---|
| 7.5% HCl | None | None | 1.404 | 3550.3032 | 90.178 | 0.100 | |
| 15% HCl | None | None | 2.175 | 5500.3023 | 139.708 | 0.154 | |
| 1.2:1 HCl-Urea | 50% dilution in seawater | 1.5% FCI-XP 1% CI-1A | 0.119 | 300.3889 | 7.63 | 0.008 | no pits |
| 1.2:1 HCl-Urea | 50% dilution in seawater | 1.5% FCI-XQ 1% CI-1A | 0.218 | 551.4715 | 14.007 | 0.015 | no pits |
| 1.2:1 HCl-Urea | 50% dilution in seawater | 1.5% FCI-XR 1% CI-1A | 0.216 | 546.6673 | 13.885 | 0.015 | no pits |
| 1.2:1 HCl-Urea | 50% dilution in seawater | 1.5% FCI-XS 1% CI-1A | 0.186 | 470.8115 | 11.959 | 0.013 | no pits |

TABLE #11

Corrosion test results from tests conducted at 90° C. for a period ranging for 6 hours with a coupon density of 7.86 g/cc having a surface area of 30.199 $cm^2$ (coupons used were N80 steel)

| Fluid | Dilution | Corrosion Package | Wt loss (g) | Mils/yr | mm/year | lb/ft2 | observations |
|---|---|---|---|---|---|---|---|
| HCl-Urea (control) | none | none | 0.117 | 304.9971 | 7.747 | 0.009 | |
| HCl-Urea | 50% dilution in seawater | none | 0.370 | 963.1762 | 24.465 | 0.027 | |
| 1.2:1 HCl-Urea | 50% dilution in seawater | 1.5% FCI-XP 1% CI-1A | 0.128 | 310.2075 | 7.879 | 0.009 | few pits on side/back |
| 1.2:1 HCl-Urea | 50% dilution in seawater | 1.5% FCI-XQ 1% CI-1A | 0.278 | 672.4795 | 17.081 | 0.019 | no pits |
| 1.2:1 HCl-Urea | 50% dilution in seawater | 1.5% FCI-XR 1% CI-1A | 0.247 | 598.3784 | 15.199 | 0.017 | no pits |
| 1.2:1 HCl-Urea | 50% dilution in seawater | 1.5% FCI-XS 1% CI-1A | 0.206 | 500.0613 | 12.702 | 0.014 | no pits |

TABLE #12

Corrosion test results from tests conducted at 90° C. for a period ranging for 6 hours with a coupon density of 7.86 g/cc having a surface area of 30.199 $cm^2$ (coupons used were L80 steel)

| Fluid | Dilution | Corrosion Package | Wt loss (g) | Mils/yr | mm/year | lb/ft2 | observations |
|---|---|---|---|---|---|---|---|
| 1.2:1 HCl-Urea | 50% dilution in seawater | 1.5% FCI-XP 1% CI-1A | 0.153 | 369.779 | 9.392 | 0.01 | few pits on side/back |
| 1.2:1 HCl-Urea | 50% dilution in seawater | 1.5% FCI-XQ 1% CI-1A | 0.289 | 698.875 | 17.751 | 0.02 | no pits |

TABLE #12-continued

Corrosion test results from tests conducted at 90° C. for a period ranging for 6 hours with a coupon density of 7.86 g/cc having a surface area of 30.199 $cm^2$ (coupons used were L80 steel)

| Fluid | Dilution | Corrosion Package | Wt loss (g) | Mils/yr | mm/year | lb/ft2 | observations |
|---|---|---|---|---|---|---|---|
| 1.2:1 HCl-Urea | 50% dilution in seawater | 1.5% FCI-XR 1% CI-1A | 0.296 | 716.0684 | 18.188 | 0.02 | no pits |
| 1.2:1 HCl-Urea | 50% dilution in seawater | 1.5% FCI-XS 1% CI-1A | 0.232 | 562.5387 | 14.288 | 0.016 | no pits |

TABLE #13

Corrosion test results from tests conducted at 90° C. for a period ranging for 6 hours with a coupon density of 7.86 g/cc having a surface area of 28.922 $cm^2$ (coupons used were P110 steel)

| Fluid | Dilution | Corrosion Package | Wt loss (g) | Mils/yr | mm/year | lb/ft2 | observations |
|---|---|---|---|---|---|---|---|
| 1.2:1 HCl-Urea | 50% dilution in seawater | 1.5% FCI-XP 1% CI-1A | 1.575 | 3983.187 | 101.173 | 0.078 | no pits |
| 1.2:1 HCl-Urea | 50% dilution in seawater | 1.5% FCI-XQ 1% CI-1A | 0.645 | 1630.141 | 41.406 | 0.046 | Yes, some pits on sides |
| 1.2:1 HCl-Urea | 50% dilution in seawater | 1.5% FCI-XR 1% CI-1A | 0.77 | 1945.954 | 49.427 | 0.055 | Yes, some pits on sides |
| 1.2:1 HCl-Urea | 50% dilution in seawater | 1.5% FCI-XS 1% CI-1A | 0.387 | 978.5395 | 24.855 | 0.027 | no pits |

TABLE #14

Corrosion test results from tests conducted at 130° C. for a period ranging for 6 hours with a coupon density of 7.86 g/cc having a surface area of 28.922 $cm^2$ (coupons used were 1018 steel)

| Fluid | Dilution | Corrosion Package | Wt loss (g) | Surface area | Mils/yr | mm/year | lb/ft2 |
|---|---|---|---|---|---|---|---|
| 4.5:1 HCl-Lysine | 50% dilution in seawater | 1.5% FCI-XQ 1% CI-1A | 1.399 | 28.922 | 3537.913 | 89.863 | 0.099 |
| 4.5:1 HCl-Lysine | 50% dilution in seawater | 1.5% FCI-XR 1% CI-1A | 1.114 | 41.4 | 1966.915 | 49.96 | 0.055 |
| 4.5:1 HCl-Lysine | 50% dilution in seawater | 1.5% FCI-XS 1% CI-1A | 0.336 | 41.4 | 592.8125 | 15.057 | 0.017 |
| 4.5:1 HCl-Lysine | 50% dilution in seawater | 1.5% FCI-XT 1% CI-1A | 3.839 | 41.4 | 6780.955 | 172.236 | 0.19 |
| 4.5:1 HCl-Lysine | 50% dilution in seawater | 1.5% FCI-XP 1% CI-1A | 0.315 | 41.4 | 556.4241 | 14.133 | 0.016 |

TABLE #15

Corrosion test results from tests conducted at 90° C. for a period ranging for 6 hours with a coupon density of 7.86 g/cc having a surface area of 41.4 $cm^2$ (coupons used were 1018 steel)

| Fluid | Corrosion Package | Wt loss (g) | Mils/yr | mm/year | lb/ft2 |
|---|---|---|---|---|---|
| 15% HCl | 1.5% FCI-XP 1% CI-1A | 0.075 | 132.8352 | 3.374 | 0.004 |
| 15% HCl | 2.5% FCI-XP 1% CI-1A | 0.068 | 119.587 | 3.038 | 0.003 |
| 15% HCl | 1.5% FCI-XQ 1% CI-1A | 1.121 | 1980.693 | 50.31 | 0.055 |
| 15% HCl | 2.5% FCI-XQ 1% CI-1A | 0.793 | 1400.069 | 35.562 | 0.039 |
| 15% HCl | 1.5% FCI-XR 1% CI-1A | 0.176 | 310.8909 | 7.897 | 0.009 |
| 15% HCl | 2.5% FCI-XR 1% CI-1A | 0.215 | 380.4881 | 9.664 | 0.011 |

TABLE #15-continued

Corrosion test results from tests conducted at 90° C. for a period ranging for 6 hours with a coupon density of 7.86 g/cc having a surface area of 41.4 $cm^2$ (coupons used were 1018 steel)

| Fluid | Corrosion Package | Wt loss (g) | Mils/yr | mm/year | lb/ft2 |
|---|---|---|---|---|---|
| 15% HCl | 1.5% FCI-XS 1% CI-1A | 0.2 | 353.2851 | 8.973 | 0.01 |
| 15% HCl | 2.5% FCI-XS 1% CI-1A | 0.228 | 402.2151 | 10.216 | 0.011 |

TABLE #16

Corrosion test results from tests conducted at 90° C. for a period ranging for 6 hours with a coupon density of 7.86 g/cc having a surface area of 30.199 $cm^2$ (coupons used were L80 steel)

| Fluid | Dilution | Corrosion Package | Wt loss (g) | Mils/yr | mm/year | lb/ft2 | Observations |
|---|---|---|---|---|---|---|---|
| 1.2:1 HCl-Urea | 50% dilution in seawater | 1.5% FCI-XP 0.5% CI-1A | 0.18 | 435.6466 | 11.065 | 0.012 | few pits on side/back |
| 1.2:1 HCl-Urea | 50% dilution in seawater | 1.5% FCI-XQ 0.5% CI-1A | 0.305 | 738.8314 | 18.766 | 0.021 | no pits |
| 1.2:1 HCl-Urea | 50% dilution in seawater | 1.5% FCI-XR 0.5% CI-1A | 0.305 | 738.8314 | 18.766 | 0.021 | no pits |
| 1.2:1 HCl-Urea | 50% dilution in seawater | 1.5% FCI-XS 0.5% CI-1A | 0.317 | 766.4377 | 19.468 | 0.021 | no pits |

TABLE #17

Corrosion test results from tests conducted at 90° C. for a period ranging for 6 hours with a coupon density of 7.86 g/cc having a surface area of 28.922 $cm^2$ (coupons used were P110 steel)

| Fluid | Dilution | Corrosion Package | Wt loss (g) | Mils/yr | mm/year | lb/ft2 | Observations |
|---|---|---|---|---|---|---|---|
| 1.2:1 HCl-Urea | 50% dilution in seawater | 1.5% FCI-XP 0.5% CI-1A | 0.388 | 981.3209 | 24.926 | 0.026 | few pits on side/back |
| 1.2:1 HCl-Urea | 50% dilution in seawater | 1.5% FCI-XQ 0.5% CI-1A | 0.589 | 1489.555 | 37.835 | 0.042 | few pits on side/back |
| 1.2:1 HCl-Urea | 50% dilution in seawater | 1.5% FCI-XR 0.5% CI-1A | 0.662 | 1674.896 | 42.542 | 0.047 | few pits on side/back |
| 1.2:1 HCl-Urea | 50% dilution in seawater | 1.5% FCI-XS 0.5% CI-1A | 0.376 | 951.2314 | 24.161 | 0.027 | few pits on side/back |

TABLE #18

Corrosion test results from tests conducted at 90° C. for a period ranging for 6 hours with a coupon density of 7.86 g/cc having a surface area of 41.4 $cm^2$ (coupons used were 1018 steel)

| Fluid | Dilution | Corrosion Package | Wt loss (g) | Mils/yr | mm/year | lb/ft2 |
|---|---|---|---|---|---|---|
| 15% HCl | 50% dilution in seawater | 1% FCI-XP 1% CI-1A | 0.135 | 239.3507 | 6.08 | 0.007 |
| 15% HCl | 50% dilution in seawater | 1% FCI-XP 0.5% CI-1A | 0.206 | 364.0603 | 9.247 | 0.01 |
| 15% HCl | 50% dilution in seawater | 0.75% FCI-XP 1% CI-1A | 0.094 | 166.7506 | 4.235 | 0.005 |
| 15% HCl | 50% dilution in seawater | 0.75% FCI-XP 0.5% CI-1A | 0.242 | 427.1217 | 10.849 | 0.012 |
| 15% HCl | 50% dilution in seawater | 1% FCI-XQ 0.5% CI-1A | 1.173 | 2072.901 | 52.652 | 0.058 |
| 15% HCl | 50% dilution in seawater | 1% FCI-XR 0.5% CI-1A | 1.204 | 2126.07 | 54.002 | 0.06 |
| 15% HCl | 50% dilution in seawater | 0.75% FCI-XQ 0.5% CI-1A | 1.022 | 1805.11 | 45.85 | 0.051 |
| 15% HCl | 50% dilution in seawater | 0.75% FCI-XR 0.5% CI-1A | 0.801 | 1415.084 | 35.943 | 0.04 |

TABLE #19

Corrosion test results from tests conducted at 90° C. for a period ranging for 6 hours with a coupon density of 7.86 g/cc having a surface area of 41.4 $cm^2$ (coupons used were 4140 steel)

| Fluid | Dilution | Corrosion Package | Wt loss (g) | Mils/yr | mm/year | lb/ft2 |
|---|---|---|---|---|---|---|
| 15% HCl | 50% dilution in seawater | 1% FCI-XQ 0.5% CI-1A | 2.553 | 4510.215 | 114.559 | 0.126 |
| 15% HCl | 50% dilution in seawater | 1% FCI-XR 0.5% CI-1A | 1.502 | 2653.171 | 67.391 | 0.074 |

TABLE #19-continued

Corrosion test results from tests conducted at 90° C. for a period ranging for 6 hours with a coupon density of 7.86 g/cc having a surface area of 41.4 $cm^2$ (coupons used were 4140 steel)

| Fluid | Dilution | Corrosion Package | Wt loss (g) | Mils/yr | mm/year | lb/ft2 |
|---|---|---|---|---|---|---|
| 15% HCl | 50% dilution in seawater | 0.75% FCI-XQ 0.5% CI-1A | 5.411 | 9558.483 | 242.785 | 0.268 |
| 15% HCl | 50% dilution in seawater | 0.75% FCI-XR 0.5% CI-1A | 2.172 | 3837.03 | 97.461 | 0.107 |
| 15% HCl | 50% dilution in seawater | 1% FCI-XQ 1% CI-1A | 0.95 | 1677.221 | 42.601 | 0.047 |
| 15% HCl | 50% dilution in seawater | 0.75% FCI-XQ 1% CI-1A | 1.836 | 3242.628 | 82.363 | 0.091 |
| 15% HCl | 50% dilution in seawater | 1% FCI-XP 1% CI-1A | 0.316 | 557.6606 | 14.165 | 0.016 |
| 15% HCl | 50% dilution in seawater | 0.75% FCI-XP 1% CI-1A | 0.874 | 1543.856 | 39.214 | 0.043 |
| 15% HCl | 50% dilution in seawater | 1% FCI-XS 1% CI-1A | 0.154 | 272.3828 | 6.919 | 0.008 |
| 15% HCl | 50% dilution in seawater | 0.75% FCI-XS 0.75% CI-1A | 0.196 | 346.0428 | 8.789 | 0.01 |

TABLE #20

Corrosion test results from tests conducted at 90° C. for a period ranging for 6 hours with a coupon density of 7.86 g/cc having a surface area of 28.922 $cm^2$ (coupons used were J55 steel)

| Fluid | Dilution | Corrosion Package | Wt loss (g) | Mils/yr | mm/year | lb/ft2 |
|---|---|---|---|---|---|---|
| 1.2:1 HCl-Urea | 50% dilution in seawater | 1.5% FCI-XP 0.5% CI-1A | 0.135 | 340.3396 | 8.645 | 0.01 |
| 1.2:1 HCl-Urea | 50% dilution in seawater | 1.5% FCI-XQ 0.5% CI-1A | 0.296 | 748.1908 | 19.004 | 0.021 |
| 1.2:1 HCl-Urea | 50% dilution in seawater | 1.5% FCI-XR 0.5% CI-1A | 0.269 | 680.932 | 17.296 | 0.019 |
| 1.2:1 HCl-Urea | 50% dilution in seawater | 1.5% FCI-XS 0.5% CI-1A | 0.252 | 638.1999 | 16.21 | 0.018 |

TABLE #21

Corrosion test results from tests conducted at 90° C. for a period ranging for 6 hours with a coupon density of 7.86 g/cc having a surface area of 30.199 $cm^2$ (coupons used were N80 steel)

| Fluid | Dilution | Corrosion Package | Wt loss (g) | Mils/yr | mm/year | lb/ft2 |
|---|---|---|---|---|---|---|
| 1.2:1 HCl-Urea | 50% dilution in seawater | 1.5% FCI-XP 0.5% CI-1A | 0.188 | 455.7459 | 11.576 | 0.013 |
| 1.2:1 HCl-Urea | 50% dilution in seawater | 1.5% FCI-XQ 0.5% CI-1A | 0.331 | 802.5196 | 20.384 | 0.022 |
| 1.2:1 HCl-Urea | 50% dilution in seawater | 1.5% FCI-XR 0.5% CI-1A | 0.351 | 851.1939 | 21.62 | 0.024 |
| 1.2:1 HCl-Urea | 50% dilution in seawater | 1.5% FCI-XS 0.5% CI-1A | 0.298 | 721.3959 | 18.323 | 0.02 |

TABLE #22

Corrosion test results from tests conducted at 90° C. for a period ranging for 6 hours with a coupon density of 7.86 g/cc having a surface area of 30.199 $cm^2$ (various steel coupons were used)

| Metal | Fluid | Corrosion Package | Wt loss (g) | Surface area ($cm^2$) | Mils/yr | mm/year | lb/ft2 |
|---|---|---|---|---|---|---|---|
| L80-13CR | 1.2:1 HCl-Urea (Diluted in 50% seawater) | 2.5% FCI-XP 5% CI-1A | 0.028 | 8.47 | 244.3424 | 6.206 | 0.007 |

TABLE #22-continued

Corrosion test results from tests conducted at 90° C. for a period ranging for 6 hours with a coupon density of 7.86 g/cc having a surface area of 30.199 $cm^2$ (various steel coupons were used)

| Metal | Fluid | Corrosion Package | Wt loss (g) | Surface area ($cm^2$) | Mils/yr | mm/year | lb/ft2 |
|---|---|---|---|---|---|---|---|
| L80-13CR | 1.2:1 HCl-Urea (Diluted in 50% seawater) | 5% FCI-XP 5% CI-1A | 0.022 | 8.47 | 185.6311 | 4.715 | 0.005 |
| L80-13CR | 1.2:1 HCl-Urea (Diluted in 50% seawater) | 5% FCI-XR 5% CI-1A | 0.019 | 8.47 | 161.4559 | 4.101 | 0.005 |
| L80-13CR | 1.2:1 HCl-Urea (Diluted in 50% seawater) | 5% FCI-XQ 5% CI-1A | 0.02 | 8.47 | 171.8167 | 4.364 | 0.005 |
| L80-13CR | 1.2:1 HCl-Urea (Diluted in 50% seawater) | 5% FCI-XS 5% CI-1A | 0.015 | 8.47 | 127.7833 | 3.246 | 0.004* |
| L80-13CR | 1.2:1 HCl-Urea (Diluted in 50% seawater) | 5% FCI-XO 5% CI-1A | 0.044 | 8.47 | 376.4426 | 9.562 | 0.011 |
| J55 | 1.2:1 HCl-Urea (Diluted in 50% seawater) | 1.5% FCI-XM 1% CI-1A | 0.294 | 28.922 | 743.8923 | 18.895 | 0.021 |
| N80 | 1.2:1 HCl-Urea (Diluted in 50% seawater) | 1.5% FCI-XM 1% CI-1A | 0.363 | 30.199 | 878.0737 | 22.303 | 0.025 |
| J55 | 15% HCl | 0.75% FCI-XM 0.5% CI-1A | 0.308 | 28.922 | 777.7746 | 19.755 | 0.022 |
| N80 | 15% HCl | 0.75% FCI-XM 0.5% CI-1A | 0.98 | 30.199 | 2373.414 | 60.285 | 0.066 |
| J55 | 1.2:1 HCl-Urea (Diluted in 50% seawater) | 1.5% FCI-XL 1% CI-1A | 0.117 | 28.922 | 295.079 | 7.495 | 0.008 |
| N80 | 1.2:1 HCl-Urea (Diluted in 50% seawater) | 1.5% FCI-XL 1% CI-1A | 0.156 | 30.199 | 377.5281 | 9.589 | 0.011 |
| N80 | 15% HCl | 1.5% FCI-XM 1% CI-1A | 0.238 | 30.199 | 577.3104 | 14.664 | 0.016 |

*no pits, but checkered surface

TABLE #23

Corrosion test results from tests conducted at 90° C. for a period ranging for 6 hours with a coupon density of 7.86 g/cc

| Steel type | Fluid | Dilution | Corrosion Package | Wt loss (g) | Surface area | Mils/yr | mm/year | lb/ft2 |
|---|---|---|---|---|---|---|---|---|
| 1018 | 1.2:1 HCl-Urea | 50% dilution in seawater | 1.5% FCI-XM 1% CI-1A | 0.338 | 41.4 | 597.5818 | 15.179 | 0.017 |
| N80 | 1.2:1 HCl-Urea | 50% dilution in seawater | 2% FCI-XM 1% CI-1A | 0.196 | 30.199 | 475.6031 | 12.080 | 0.013 |
| J55 | 1.2:1 HCl-Urea | 50% dilution in seawater | 2% FCI-XM 1% CI-1A | 0.191 | 28.922 | 482.9484 | 12.267 | 0.014 |
| L80 | 1.2:1 HCl-Urea | 50% dilution in seawater | 2% FCI-XM 1% CI-1A | 0.305 | 30.199 | 738.8314 | 18.766 | 0.021 |
| N80 | 1.2:1 HCl-Urea | 50% dilution in seawater | 1.5% FCI-XL 1% CI-1A | 0.148 | 30.199 | 357.9131 | 9.091 | 0.010 |
| J55 | 1.2:1 HCl-Urea | 50% dilution in seawater | 1.5% FCI-XL 1% CI-1A | 0.115 | 28.922 | 290.0219 | 7.367 | 0.008 |
| L80 | 1.2:1 HCl-Urea | 50% dilution in seawater | 1.5% FCI-XL 1% CI-1A | 0.115 | 30.199 | 278.2423 | 7.067 | 0.008 |

TABLE 24

Corrosion testing results carried on various steel coupons (having a surface are of 8.47 $cm^2$) with a metal density of 7.86 g/cc

| Coupon | Fluid | Temp ° C. | Corrosion Package | Run time (hours) | Mils/yr | Mm/year | Lb/ft2 | Pit Index |
|---|---|---|---|---|---|---|---|---|
| L80-13CR | 90% 4.5:1 HCl-Lysine | 90 | 5% FCI-XM 5% CI-1A | 6 | 285.7855776 | 7.259 | 0.008 | |
| L80-13CR | 90% 4.5:1 HCl-Lysine | 90 | 7.5% FCI-XM 7.5% CI-1A | 6 | 240.0253492 | 6.097 | 0.007 | |
| L80-13CR | 90% 4.5:1 HCl-Lysine | 90 | 4% FCI-XM 4% CI-1A | 6 | 297.8731851 | 7.566 | 0.008 | |
| L80-13CR | 90% 4.5:1 HCl-Lysine | 90 | 3% FCI-XM 3% CI-1A | 6 | 282.3319754 | 7.171 | 0.008 | |
| 2507 | 90% 4.5:1 HCl-Lysine | 90 | 7.5% FCI-XM 7.5% CI-1A | 6 | 898.7999585 | 22.830 | 0.025 | few blisters |
| 2507 | 90% 4.5:1 HCl-Lysine | 90 | 4% FCI-XM 4% CI-1A | 6 | 2206.851771 | 56.054 | 0.062 | many blisters |
| 2507 | 90% 4.5:1 HCl-Lysine | 90 | 7.5% FCI-XM 7.5% CI-1A | 3 | 383.3498382 | 9.737 | 0.005 | |
| 2507 | 90% 4.5:1 HCl-Lysine | 90 | 7.5% FCI-XM 7.5% CI-1A | 4 | 314.7094956 | 7.994 | 0.006 | |
| 2507 | 90% 4.5:1 HCl-Lysine | 90 | 7.5% FCI-XM 7.5% CI-1A | 5 | 446.5507575 | 11.342 | 0.010 | |
| 2507 | 90% 4.5:1 HCl-Lysine | 90 | 5% FCI-XM-AZ 5% CI-1A | 5 | 771.8800797 | 19.606 | 0.018 | many blisters |
| L80-13CR | 50% 4.5:1 HCl-Lysine | 90 | 5% FCI-XM 5% CI-1A | 6 | 186.4945159 | 4.737 | 0.005 | |
| L80-13CR | 50% 4.5:1 HCl-Lysine | 90 | 7.5% FCI-XM 7.5% CI-1A | 6 | 197.7187229 | 5.022 | 0.006 | |
| 2507 | 50% 4.5:1 HCl-Lysine | 90 | 5% FCI-XM 5% CI-1A | 5 | 782.2408861 | 19.869 | 0.018 | |
| 2507 | 50% 4.5:1 HCl-Lysine | 90 | 7.5% FCI-XM 7.5% CI-1A | 5 | 662.0555314 | 16.816 | 0.015 | |
| 2507 | 50% 4.5:1 HCl-Lysine | 90 | 7.5% FCI-XM 7.5% CI-1A | 6 | 677.7694212 | 17.215 | 0.019 | |
| 2507 | 15% HCl | 90 | 5% FCI-XM 5% CI-1A | 6 | 512.8599187 | 13.027 | 0.014 | |
| 2507 | 15% HCl | 90 | 7.5% FCI-XM 7.5% CI-1A | 6 | 427.3832656 | 10.856 | 0.012 | |
| 2507 | 75% 4.5:1 HCl-Lysine | 90 | 5% FCI-XM 5% CI-1A | 5 | 44166.04569 | 1121.818 | 1.033 | |
| 2507 | 75% 4.5:1 HCl-Lysine | 90 | 7.5% FCI-XM 7.5% CI-1A | 5 | 44124.60246 | 1120.765 | 1.032 | |
| 2507 | 75% 4.5:1 HCl-Lysine | 90 | 7.5% FCI-XM 7.5% CI-1A | 6 | 37018.298 | 940.265 | 1.039 | |

TABLE 25

Corrosion testing results carried on 1018 steel coupons with a metal density of 7.86 g/cc (surface area of 41.4 $cm^2$) for a run time of 6 hours

| Fluid | Temp ° C. | Corrosion Package | Mils/yr | Mm/year | Lb/ft2 | Pit Index |
|---|---|---|---|---|---|---|
| 15% HCl | 110 | 1.5 FCI-XM 1% CI-1A | 316.1902066 | 8.031 | 0.009 | |
| 15% HCl | 110 | 2 FCI-XM 1% CI-1A | 351.1654362 | 8.920 | 0.010 | |
| 15% HCl | 110 | 2 FCI-XM 1.5% CI-1A | 312.1274274 | 7.928 | 0.009 | |
| 15% HCl | 90 | 1.5% FCI-XM 1% CI-1A | 2327.972477 | 59.131 | 0.065 | |
| 15% HCl | 70 | 1% FCI-XM 0.75% CI-1A | 141.667344 | 3.598 | 0.004 | |
| 15% HCl | 90 | 1.5% FCI-XM 1% CI-1A | 631.1439153 | 16.031 | 0.018 | |
| 15% HCl | 90 | 2 FCI-XM 1% CI-1A | 372.7158302 | 9.467 | 0.010 | |
| 15% HCl | 90 | 2 FCI-XM 1.5% CI-1A | 322.7259819 | 8.197 | 0.009 | |
| 15% HCl | 115 | 2 FCI-XM 1.5% CI-1A | 5645.673293 | 143.400 | 0.158 | |

TABLE 26

Corrosion testing results carried using 15% HCl on J55 or L80 steel coupons with a metal density of 7.86 g/cc

| Coupon | Temp ° C. | Corrosion Package | Surface area (cm2) | Run time (hours) | Mils/yr | Mm/year | Lb/ft2 |
|---|---|---|---|---|---|---|---|
| J55 | 90 | 1.5 FCI-XM 1.0% CI-1A | 28.922 | 6 | 472.0757814 | 11.991 | 0.013 |
| J55 | 115 | 1.5 FCI-XM 1.0% CI-1A | 28.922 | 6 | 1225.070788 | 31.117 | 0.034 |
| J55 | 115 | 2 FCI-XM 1.5% CI-1A | 28.922 | 6 | 612.6618203 | 15.562 | 0.017 |
| L80 | 115 | 2 FCI-XM 1.5% CI-1A | 30.199 | 24 | 463.2528848 | 11.767 | 0.052 |

TABLE 27

Corrosion testing results carried on Q-125 steel coupons (having a surface are of 45.71 $cm^2$) for a run time of 6 hours at various temperatures

| Fluid | Temp ° C. | Corrosion Package | Mils/yr | Mm/year | Lb/ft2 | Pit Index |
|---|---|---|---|---|---|---|
| 90% 4.5:1 HCl-Lysine | 90 | 2.5 FCI-XM 2.0% CI-1A | 258.0589172 | 6.555 | 0.007 | No pits |
| 90% 4.5:1 HCl-Lysine | 90 | 1.75 FCI-XM 2.0% CI-1A | 257.4189695 | 6.538 | 0.007 | Yes |
| 50% 4.5:1 HCl-Lysine | 90 | 2.5 FCI-XM 2.0% CI-1A | 368.1299246 | 9.351 | 0.010 | Yes |
| 50% 4.5:1 HCl-Lysine | 90 | 2.75 FCI-XM 2.5% CI-1A | 333.8927217 | 8.481 | 0.009 | Yes |
| 50% 4.5:1 HCl-Lysine | 90 | 1.0 FCI-XM 1.0% CI-1A | 190.8644068 | 4.848 | 0.005 | Yes |
| 21% MSA | 90 | 1.5 FCI-XM 1.0% CI-1A | 255.8191002 | 6.498 | 0.007 | No pits |
| 90% 4.5:1 HCl-Lysine | 120 | 3.0 FCI-XM 3.0% CI-1A | 777.2165032 | 19.741 | 0.022 | Yes |
| 90% 4.5:1 HCl-Lysine | 120 | 5.0 FCI-XM 5.0% CI-1A | 705.3823719 | 17.917 | 0.020 | Yes |
| 21% MSA | 120 | 2.0 FCI-XM 1.5% CI-1A | 1058.793499 | 26.893 | 0.030 | Yes |
| 21% MSA | 120 | 2.5 FCI-XM 2.0% CI-1A | 457.7226051 | 11.626 | 0.013 | Yes |
| 21% MSA | 90 | 2.25 FCI-XM 2.0% CI-1A | 213.7425377 | 5.429 | 0.006 | No pits |
| 50% 4.5:1 HCl-Lysine | 90 | 3.5 FCI-XM 3.5% CI-1A | 353.8910879 | 8.989 | 0.010 | Yes |

TABLE 28

Corrosion testing results carried on various steel coupons at a temperature of 90° C.

| Coupon | Fluid | Corrosion Package | Surface area | Run time | Mils/yr | Mm/year | Lb/ft2 |
|---|---|---|---|---|---|---|---|
| N80 | Spent 50% 4.5:1 HCl-Lysine | 1.75% FCI-XM 0.75% CI- | 30.199 | 24 | 9.081015776 | 0.231 | 0.001 |
| N80 | Spent 90% 4.5:1 HCl-Lysine | 1.75% FCI-XM 0.75% CI- | 30.199 | 24 | 14.0453044 | 0.357 | 0.002 |
| Super Duplex 2507 | Spent 90% 4.5:1 HCl-Lysine | 1.75% FCI-XM 0.75% CI- | 33.497 | 6 | 1.309908806 | 0.033 | 0.000 |
| Super Duplex 2507 | Spent 90% 4.5:1 HCl-Lysine | 1.75% FCI-XM 0.75% CI- | 33.497 | 6 | 3.274772014 | 0.083 | 0.000 |

TABLE 29

Corrosion testing results carried out using 15% HCl on 1018 steel coupons (having a surface are of 41.4 $cm^2$) for a run time of 6 hours at various temperatures

| Temp ° C. | Corrosion Package | Mils/yr | Mm/year | Lb/ft2 |
|---|---|---|---|---|
| 120 | 1.0% FCI-XL 1.0% CI-1A | 203.3156021 | 5.164 | 0.006 |
| 120 | 1.5% FCI-XL 1.0% CI-1A | 189.8907666 | 4.823 | 0.005 |
| 120 | 2.0% FCI-XL 1.0% CI-1A | 167.9870874 | 4.267 | 0.005 |
| 120 | 1.0% FCI-XL 1.75% CI-1A | 151.3826855 | 3.845 | 0.004 |
| 120 | 1.5% FCI-XL 1.75% CI-1A | 130.7155044 | 3.320 | 0.004 |
| 120 | 2.0% FCI-XL 1.75% CI-1A | 137.6045648 | 3.495 | 0.004 |
| 90 | 0.5% FCI-XL 0.5% CI-1A | 140.430846 | 3.567 | 0.004 |
| 90 | 1.0% FCI-XL 0.5% CI-1A | 91.85413824 | 2.333 | 0.003 |
| 90 | 1.5% FCI-XL 0.5% CI-1A | 72.07017 | 1.831 | 0.002 |
| 90 | 0.5% FCI-XL 0.75% CI-1A | 132.4819302 | 3.365 | 0.004 |
| 90 | 1.0% FCI-XL 0.75% CI-1A | 81.25558383 | 2.064 | 0.002 |
| 90 | 1.5% FCI-XL 0.75% CI-1A | 63.59132647 | 1.615 | 0.002 |
| 90 | 0.3% FCI-XL 0.2% CI-1A | 4466.230829 | 113.442 | 0.125 |
| 90 | 0.5% FCI-XL 0.2% CI-1A | 278.2120533 | 7.067 | 0.008 |
| 120 | 1.0% FCI-XL 0.5% CI-1A | 316.5434918 | 8.040 | 0.009 |
| 120 | 1.5% FCI-XL 0.75% CI-1A | 250.6558119 | 6.367 | 0.007 |
| 90 | 0.4% FCI-XL 0.2% CI-1A | 960.0523872 | 24.385 | 0.027 |
| 120 | 0.75% FCI-XL 0.5% CI-1A | 279.4485513 | 7.098 | 0.008 |
| 120 | 1.0% FCI-XL 0.25% CI-1A | 275.032487 | 6.986 | 0.008 |

TABLE 30

Corrosion testing results carried out using 15% HCl on Q-125 steel coupons (having a surface are of 45.71 $cm^2$) for a run time of 6 hours at various temperatures

| Coupon | Temp (° C.) | Corrosion Package | Surface area (cm2) | Mils/yr | Mm/year | Lb/ft2 | Pit index |
|---|---|---|---|---|---|---|---|
| L80 | 90 | 0.5% FCI-XL 0.2% CI-1A | 30.199 | 312.8712635 | 7.947 | 0.009 | 2 |
| N80 | 90 | 0.5% FCI-XL 0.2% CI-1A | 30.199 | 202.6882721 | 5.148 | 0.006 | 3 |
| J55 | 90 | 0.5% FCI-XL 0.2% CI-1A | 28.922 | 215.1775522 | 5.466 | 0.006 | 0 |
| P110 | 90 | 0.5% FCI-XL 0.2% CI-1A | 28.922 | 308.2273045 | 7.829 | 0.009 | 0 |
| QT-900 | 90 | 0.5% FCI-XL 0.2% CI-1A | 34.31 | 143.8728277 | 3.654 | 0.004 | 1 |
| 1018CS | 90 | 0.5% FCI-XL 0.2% CI-1A | 37.712 | 499.530509 | 12.688 | 0.014 | 2 |
| L80 | 120 | 1.0% FCI-XL 0.25% CI-1A | 30.199 | 985.3507518 | 25.028 | 0.028 | 6 |
| N80 | 120 | 1.0% FCI-XL 0.25% CI-1A | 30.199 | 629.3749334 | 15.986 | 0.018 | 7 |
| J55 | 120 | 1.0% FCI-XL 0.25% CI-1A | 28.922 | 356.0164436 | 9.043 | 0.010 | 1 |
| P110 | 120 | 1.0% FCI-XL 0.25% CI-1A | 28.922 | 614.9374935 | 15.619 | 0.017 | 1 |
| QT-900 | 120 | 1.0% FCI-XL 0.25% CI-1A | 34.31 | 600.8555574 | 15.262 | 0.017 | 2 |
| 1018CS | 120 | 1.0% FCI-XL 0.25% CI-1A | 37.712 | 776.2502436 | 19.717 | 0.022 | 1 |
| N80 | 80 | 1.5% FCI-XM (w/6-3*) 1.0% CI-1A | 30.199 | 311.418301 | 7.910 | 0.009 | |
| N80 | 80 | 1.5% FCI-XM (w/6-3*) | 30.199 | 501.2720708 | 12.732 | 0.014 | |

Wherein 6-3 refers to a short chain ethoxylate present as solvent in the corrosion package.

It replaces entirely the initial solvent used in the CI package, i.e. methanol.

TABLE 31

Corrosion testing results carried out using 90% MEA:HCl (in a 1:4 ratio) on L80-13CR steel coupons (having a density of 7.86 g/cc and surface are of 8.47 $cm^2$) for a run time of either 5 or 6 hours at various temperatures

| Temp ° C. | Corrosion Package | Initial wt. (g) | Final wt. (g) | Loss wt. (g) | Run time | Mils/yr | mm/year | lb/ft2 | Pit Index |
|---|---|---|---|---|---|---|---|---|---|
| 90 | 3.0% FCI-XM 3.0% CI-1A | 4.5062 | 4.4855 | 0.021 | 6 | 178.7239111 | 4.540 | 0.005 | |
| 90 | 5.0% FCI-XM 5.0% CI-1A | 4.5087 | 4.4888 | 0.020 | 6 | 171.8167068 | 4.364 | 0.005 | |
| 110 | 3.0% FCI-XM 3.0% CI-1A | 4.4348 | 4.3916 | 0.043 | 6 | 372.9890318 | 9.474 | 0.010 | |
| 110 | 5.0% FCI-XM 5.0% CI-1A | 4.4964 | 4.4538 | 0.043 | 6 | 367.8086286 | 9.342 | 0.010 | |
| 90 | 2.5% FCI-XM 2.0% CI-1A | 4.5042 | 4.4814 | 0.023 | 6 | 196.8553223 | 5.000 | 0.006 | N |
| 90 | 2.5% FCI-XM 2.5% CI-1A | 4.4481 | 4.4267 | 0.021 | 6 | 184.7677148 | 4.693 | 0.005 | N |
| 110 | 2.5% FCI-XM 2.5% CI-1A | 4.4813 | 4.4334 | 0.048 | 6 | 413.568857 | 10.505 | 0.012 | N |
| 110 | 3.0% FCI-XM 3.0% CI-1A | 4.4714 | 4.4397 | 0.032 | 6 | 273.6979701 | 6.952 | 0.008 | N |
| 110 | 2.5% FCI-XM 2.5% CI-1A | 4.5117 | 4.4957 | 0.016 | 5 | 165.772903 | 4.211 | 0.004 | N |
| 110 | 3.0% FCI-XM 3.0% CI-1A | 4.4393 | 4.4127 | 0.027 | 5 | 275.5974513 | 7.000 | 0.006 | N |

Additionally, corrosion inhibition packages according to preferred embodiments of the present invention will allow the end user to utilize synthetic and modified acids that have down-hole performance advantages, transportation and storage advantages as well as the health, safety and environmental advantages. The person skilled in the art will also understand that the corrosion package according to the present invention is also useful when utilized with conventional acid systems.

In addition to stability at high temperatures and desirable corrosion rates as discussed above, the use of synthetic and modified acids along with a corrosion package according to a preferred embodiment of the present invention, allows for at least one of the following advantages: reduction in skin corrosiveness, a more controlled or methodical spending or reacting property, minimizing near well bore damage typically caused by an ultra-aggressive reaction with the formation typically caused by HCl and increasing formation penetration providing superior production over time.

Uses of Corrosion Inhibition Packages According to Preferred Embodiments of the Present Invention The uses (or applications) of the corrosion inhibition packages according to the present invention when combined (or mixed) with acidic compositions upon dilution of the latter ranging from approximately 1 to 90% dilution, include, but are not limited to: injection/disposal well treatments; matrix acid squeezes, soaks or bullheads; acid fracturing, acid washes; fracturing spearheads (breakdowns); pipeline scale treatments, cement breakdowns or perforation cleaning; pH control; and de-scaling applications. As would be understood by the person skilled in the art, the methods of use generally comprise the following steps: providing a composition comprising a corrosion inhibitor package according to a preferred embodiment of the present; mixing said package with an acid composition; exposing a surface (such as a metal surface) to the acid composition comprising the package; allowing the acid composition a sufficient period of time to act upon said surface; and optionally, removing the acid composition when the exposure time has been determined to be sufficient for the operation to be complete or sufficiently complete. Another method of use comprises: injecting the acid composition comprising the package into a well and allowing sufficient time for the acid composition to perform its desired function. Yet another method of use comprises: exposing the acid composition comprising the package to a body of fluid (typically water) requiring a decrease in the pH and allowing sufficient exposure time for the acid composition to lower the pH to the desired level.

One of the advantages of the use of a synthetic acid composition using a corrosion inhibition package according to a preferred embodiment of the present invention includes: the reduction of the total loads of acid, and the required number of tanks by delivering concentrated product to location and diluting with fluids available on location (with low to high salinity production water).

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. An aqueous synthetic or modified acidic composition comprising a corrosion inhibitor package, an acid composition comprising an acid selected from the group consisting of mineral acids; organic acids, synthetic acids; modified acids; complexed acids and combinations thereof, and wherein said corrosion inhibitor package comprises, a terpene in an amount ranging from 5% to 30% by volume of the total volume of the corrosion inhibition package;

a cinnamaldehyde or a derivative thereof in an amount ranging from 5% to 30% by volume of the total volume of the corrosion inhibition package;

at least one amphoteric surfactant in an amount ranging from 2% to 20% by volume of the total volume of the corrosion inhibition package;

an anionic surfactant which is β-Alanine, N-(2-carboxyethyl)-N-dodecyl-, sodium salt (1:1); and a solvent in an amount ranging from 25% to 80% by volume of the total volume of the corrosion inhibition package;

wherein the volume % of the corrosion inhibition package in the aqueous synthetic or modified acidic composition ranges from 0.1 to 10%, and wherein the terpene is selected from the group consisting of citral and ocimene, the at least one amphoteric surfactant is cocamidopropyl betaine, and the solvent is selected from the group consisting of: isopropanol; methanol; ethanol; 2-butoxyethanol; diethylene glycol; a short chain ethoxylate; and combinations thereof.

2. The aqueous synthetic or modified acidic composition according to claim 1 further comprising a corrosion inhibitor intensifier selected from the group consisting of a metal iodide or iodate, aluminum chloride, calcium chloride, bismuth chloride, magnesium chloride, and combinations thereof.

3. The aqueous synthetic or modified acidic composition according to claim 1, wherein the acid is selected from the group consisting of hydrochloric acid; Lysine-HCl; Urea-HCl; hydrofluoric acid; sulfuric acid; methanesulfonic acid; methanesulfonic acid-Urea; phosphoric acid; phosphoric acid-urea; p-toluene sulfonic acid; and monoethylamine-HCl.

4. The aqueous synthetic or modified acidic composition according to claim 1, wherein the acid composition comprises lysine and hydrochloric acid in a molar ratio of not less than 1:12.

5. The aqueous synthetic or modified acidic composition according to claim 1, wherein the acid composition comprises urea and hydrochloric acid in a molar ratio of not less than 0.1:1.

6. The aqueous synthetic or modified acidic composition according to claim 2, wherein the corrosion inhibitor intensifier is potassium iodide and the potassium iodide is present in an amount ranging from 0.1 to 1.5% vol./vol. of the aqueous synthetic or modified acidic composition.

7. A corrosion inhibition package for use with an aqueous synthetic or modified acidic composition comprising a corrosion inhibitor component, wherein said corrosion inhibitor component comprises a terpene present in an amount ranging from 5% to 30% by volume of the total volume of the corrosion inhibition package;

a cinnamaldehyde or a derivative thereof present in an amount ranging from 5% to 30% by volume of the total volume of the corrosion inhibition package;

at least one amphoteric surfactant present in an amount ranging from 2% to 20% by volume of the total volume of the corrosion inhibition package, wherein the at least one amphoteric surfactant is selected from the group consisting of an amido betaine surfactant, an amido sultaine surfactant, and combinations thereof, an anionic surfactant which is β-Alanine, N-(2-carboxyethyl)-N-dodecyl-, sodium salt (1:1); and a solvent present in an amount ranging from 25% to 80% by volume of the total volume of the corrosion inhibition package, wherein the terpene is selected from the group consisting of citral and ocimene, and the at least one amphoteric surfactant is cocamidopropyl betaine and wherein the solvent is selected from the group consisting of isopropanol; methanol; ethanol; 2-butoxyethanol; diethylene glycol; a short chain ethoxylate; and combinations thereof.

8. The corrosion inhibition package according to claim 7 comprising cocamidopropyl betaine in an amount of about 5% by volume of the total volume of the package; Citral in an amount of about 10% by volume of the total volume of the package; cinnamaldehyde in an amount of about 10% by volume of the total volume of the package; and methanol in an amount of about 75% by volume of the total volume of the package.

9. The corrosion inhibition package according to claim 7, wherein the corrosion inhibitor component is a water-soluble corrosion inhibitor component.

10. A corrosion inhibition package for use with an aqueous acid composition, said corrosion inhibition package comprising a corrosion inhibitor component, wherein said corrosion inhibitor component consists of a terpene; a cinnamaldehyde or a derivative thereof, at least one amphoteric surfactant; an anionic surfactant which is β-Alanine, N-(2-carboxyethyl)-N-dodecyl-, sodium salt (1:1); and a solvent.

11. The corrosion inhibition package according to claim 10, wherein the corrosion inhibitor component is a water-soluble corrosion inhibitor component.

12. A method of making the aqueous synthetic or modified acidic composition of claim 1, said method comprising the steps of:

preparing the corrosion inhibition package by mixing the solvent and the at least one amphoteric surfactant to form a solvent-surfactant solution;

dispersing the terpene in the solvent-surfactant solution;

adding the cinnamaldehyde or a derivative thereof and the β-Alanine, N-(2-carboxyethyl)-N-dodecyl-, sodium salt (1:1); and mixing the corrosion inhibition package with the acid composition.

13. A method of using the aqueous synthetic or modified acidic composition of claim 1 in the oil industry, said method comprising the steps of:

preparing the aqueous synthetic or modified acidic composition of claim 1;

introducing the aqueous synthetic or modified acidic composition while performing an activity in the oil industry, wherein the activity is selected from the group consisting of: stimulating formations; assisting in reducing breakdown pressures during downhole pumping operations; treating wellbore filter cake post drilling operations; assisting in freeing stuck pipe; descaling pipelines and/or production wells; increasing injectivity of injection wells; lowering the pH of a fluid; fracturing wells; performing matrix stimulations; conducting annular and bullhead squeezes & soaks; pickling tubing, pipe and/or coiled tubing; increasing effective permeability of formations; reducing or removing wellbore damage; cleaning perforations; solubilizing limestone, dolomite, and calcite; and scale removal from a surface selected from the group consisting of: equipment, wells and related equipment and facilities.

* * * * *